April 3, 1928.
C. W. TYDEMAN
1,664,954
CONSTANT CAPACITY AUTOMATIC CLUTCH
Filed Nov. 1, 1927
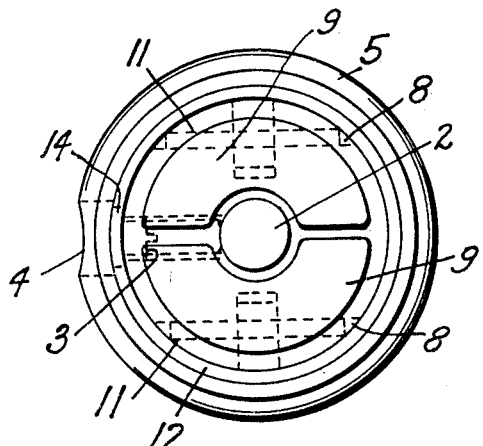
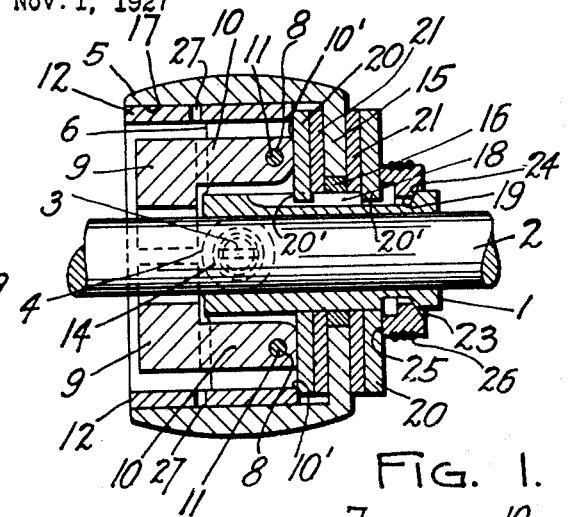
FIG. 2.　　　　　　　　　　FIG. 1.
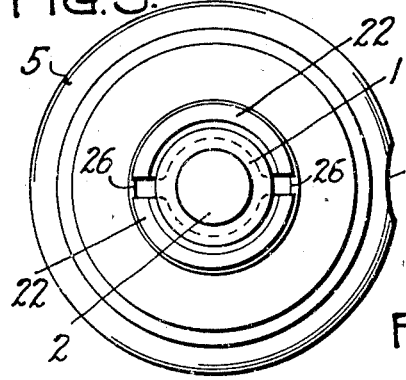
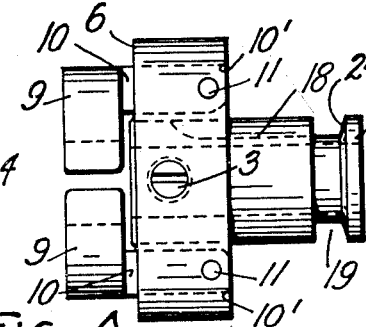
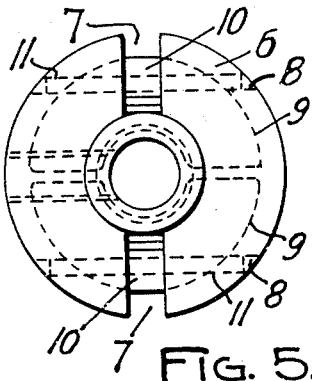
FIG. 3.　　　FIG. 4.　　　FIG. 5.
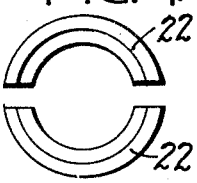
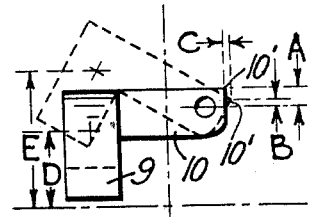
FIG. 6.　FIG. 8.　FIG. 7.　FIG. 9.
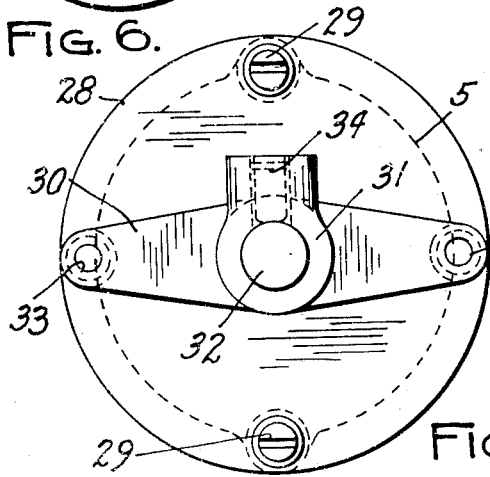
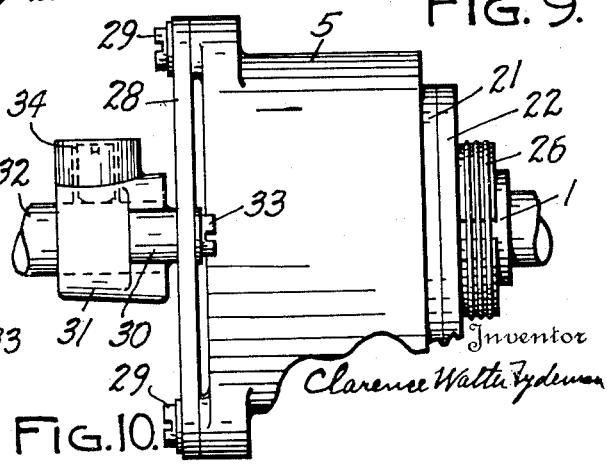
FIG. 11.　FIG. 10.
Inventor
Clarence Walter Tydeman
By
Rolland L. Pratt
Attorney Patented Apr. 3, 1928.

1,664,954

UNITED STATES PATENT OFFICE.

CLARENCE WALTER TYDEMAN, OF DENVER, COLORADO.

CONSTANT-CAPACITY AUTOMATIC CLUTCH.

Application filed November 1, 1927. Serial No. 230,276.

My invention relates to an improvement over my former invention in automatic clutches for power transmission, application for Letters Patent of the United States on which was filed February 15th, 1927, Serial Number 168,358.

In the preferred form of my former invention, the cone type of friction clutch was employed; there was but one bearing between the hub and the rim of the clutch, and the weighted levers were spaced along the shaft from this bearing; and the clutch adjustment was made by a threaded nut, locked by another similar nut, this to provide adjustment to take care of wear between the friction surfaces of the clutch and thus to maintain the capacity of the clutch the same by proper adjustment as required.

The adjusting nut was subjected to friction and wear as it was, in effect, one of the friction surfaces of the clutch.

The object of my present invention is to provide an automatic clutch having an automatic take-up for wear between the driving and the driven members of the clutch, so that the capacity of the clutch will remain constant at all times regardless of wear of the clutch friction surfaces.

A further object is to provide an automatic clutch having an automatic take-up device that is not subject to the rotative effect due to the friction received by any of the clutch members, so that the take-up itself will not wear.

A further object is to provide an automatic friction clutch having great capacity, but taking up little space.

A further object is to provide a much better alignment and much greater bearing surface between the two members of the friction clutch, the bearing surfaces being also more centrally located.

The above objects are accomplished by the construction illustrated in the drawings, in which:—

Figure 1 is a central vertical section through my new automatic clutch.
Figure 2 is an end elevation of Figure 1.
Figure 3 is an end elevation of Figure 1.
Figure 4 is a side elevation of the driving sleeve unit, without the bushing.
Figure 5 is an end elevation of Figure 4.
Figure 6 is an elevation of the clutch driving plate.
Figure 7 is an elevation of the adjusting washer.

Figure 8 is an elevation of the free clutch plate.
Figure 9 is a diagram showing the change in leverage and power of the weighted levers as the clutch surfaces wear.
Figure 10 shows the construction of my automatic clutch when used to join two shafts, without the use of a belt.
Figure 11 is an end elevation of Figure 10.

In Figure 1 the driving sleeve 1 is secured to the shaft 2 by the set screw 3, which is threaded into the sleeve 1, and which may be inserted through the hole 4 in the pulley 5.

The sleeve 1 has an enlarged end 6 which is provided with two slots 7; see Figure 5.

The enlarged end 6 is provided with the two holes 8 at right angles to the two slots 7. The two weights 9 have arms 10, which fit in the slots 7 and are pivoted upon the pins 11 mounted in the holes 8.

The bearing bushing 12 is pressed upon the enlarged end 6 of the sleeve 1 and also acts to hold the pins 11 in place.

The bushing 12 is provided with the hole 14, which registers with the threaded hole which receives the set screw 3 in the enlarged end 6 of the sleeve 1.

The pulley 5 is provided with the wall 15 which acts as a double faced driven clutch plate. The wall 15 is bushed with the bushing 16, which has a free running fit on the sleeve 1.

The bushing 12 on the enlarged end 6 of the sleeve 1, has a free running fit in the bore 17 of the pulley 5.

Thus the pulley 5 is mounted upon the sleeve 1 by bearings which total nearly the entire length of the pulley.

The sleeve 1 is provided with the keyway 18 and with the groove 19.

In assembling the automatic clutch, one clutch driving plate 20, is mounted upon the sleeve 1 adjacent the enlarged end 6 and the ends of the arms 10 of the fly weights, the key 20' fitting in the keyway 18, and one free clutch plate 21 is then mounted on the sleeve 1 next to the driving plate 20. The pulley 5 is next mounted upon the sleeve 1 and the enlarged end 6, the wall 15 being made to contact with the free clutch plate 21.

The other free clutch plate 21 is then mounted on the sleeve 1, followed by the other driving plate 20, whose key 20' fits in the keyway 18.

The two halves of the adjusting washer 22 are then mounted on the sleeve 1, the bevel face 23 of the washer against the bevel face 24 of the groove 19, and the flat face 25 of the washer against the driving clutch plate 20.

The spring ring 26 is then sprung over the two halves of the adjusting washer 22, its tension forcing the halves of the washer into the groove 19, this movement, because of the bevels 23 and 24 acting to force the washer 22 against the driving clutch plate 20.

When the clutch is manufactured the proportions are to be such that there will be solid contact between the enlarged end 6, the clutch plates and the wall 15 when the washer 22 has entered the groove 19 for but a third or a half of its depth, leaving the remainder of the depth of the groove for a margin of action for the washer. The tension of the spring ring 26 is so proportioned to the angle of the bevels of the washer 22 and the groove 19, as well as to the power exerted by the flyweights and to the desired clutch torque, that when the clutch is transmitting its maximum torque, the end thrust on the washer 22 will not be sufficient to push it outward along the bevel face 24 against the tension of the spring ring 26. That is, the automatic adjustment is irreversible by the action of the flyweights.

But, each time the clutch is stationary and the flyweights are relieved of all centrifugal force, if there has been any wear on the clutch surfaces, the tension of the spring ring 26, acting upon the washer 22 and in turn upon the bevels 23 and 24, will push the adjacent driving clutch plate 20 along the sleeve 1 toward the weights and thus take up the wear that has taken place and bring all plates and parts of the clutch into contact. That is, the wear is automatically taken up and the capacity of the clutch is thereby maintained constant.

This spring actuated automatic take-up causes a small initial friction between the clutch surfaces, but it is so small in proportion to what is required for full engagement of the clutch that the driving member may get up to speed before the clutch is fully engaged.

And this means that when the clutch is mounted on a small electric motor, the initial friction of the clutch is so small that it allows even such a motor to get up to speed almost as if the small initial friction were not present.

When the motor gets up near its normal speed the flyweights are acted upon by enough centrifugal force to throw them out and force the corners 10' of the arms 10 against the adjacent driving clutch plate with sufficient pressure to fully engage the clutch. This action is shown to an exaggerated extent in Figure 9. It will be noted that in the position of the weight 9 shown by the full lines, the effective leverage of the corner 10' is indicated by the letter A.

The radius of the center of gravity is indicated by the letter D. When the weight has been thrown outward by centrifugal force till it is in the dotted line position, it has moved the adjacent clutch plate forward a distance indicated by the letter C. In this new position, the radius of the center of gravity is indicated by the letter E and the effective leverage of the corner 10' by the letter B.

Thus it will be seen that when the clutch surfaces wear an amount equal to the distance C, not only will the weight be further out where its centrifugal force will be greater, but the leverage this greater force will be working with will be much more powerful.

The dotted line position of the weight shown in Figure 9 is much exaggerated, but it shows clearly that the minute the clutch surfaces begin to wear, the capacity of the automatic clutch at once begins to increase. And since this is true, the entire object of my automatic friction clutch would be lost if the clutch is not adjusted properly before the wear has made its capacity too great.

In my former invention adjustment was provided, but if it were neglected at any time when required, the safety factor of the clutch would be eliminated.

In my present invention, the adjusting washer 22, with the spring ring 26 and the bevels 23 and 24 all combine to automatically take up the wear that has taken place at any time, upon the first occasion that the clutch is stationary, as stated above.

This automatic take-up, by the slight initial engagement it provides between the clutch surfaces, makes certain that the clutch will be fully engaged after the slightest outward movement of the weights, and the resulting slight movement of the adjacent clutch plate by the corner 10'.

Thus, regardless of wear, the radius of the center of gravity of the weights will remain the same, the resulting centrifugal force will remain the same, and the leverage of the corner 10' will remain the same, and hence the capacity of the clutch will remain the same, so that it can be relied upon to adequately protect a certain size of fuse and of motor regardless of wear of the clutch surfaces, till the entire take-up provided by the adjustment washer 22 has been used.

By overhanging the bushing 12 on the enlarged end 6 of the sleeve 1, not only a large and long bearing is obtained, but the construction makes possible the positioning of the weights within the bushing and in the same space along the shaft as that used by the bearing, thus cutting down the over-all length of the clutch without detracting in any way from its capacity or its long wearing qualities.

And permitting the arms 10 to extend to the end of the bushing 12 and the enlarged end 6, provides the weights with great leverage, and the clutch with great capacity, also without increase of the over-all length of the assembled clutch.

By the use of the plate type clutch, with the two free clutch plates, a much greater clutch surface is provided, with the resulting much greater length of life, which, combined with the large weights and their powerful leverage gives a large capacity, long lived clutch, in about the same space occupied by the cone type of clutch used in my former invention.

The plate type clutch also permits a bearing to be provided by the bushing 16 of the wall 15, and this bearing together with that furnished by the bushing 12 acts to adequately align the two members of the clutch and insure long bearing life to the construction.

Oil holes through the pulley 5 may be provided, if desired, but I believe the clutch may be sufficiently oiled as it is shown, by an oil can, the oil being squirted between the two halves of the adjusting washer 22, where it will work along the keyway 18 to the bushing 16, and also oil being squirted into the two slots 7 in the enlarged end 6 of the oil sleeve 1, where it will work through the oil holes 27 in the bushing 12, and lubricate its bearing with the pulley 5.

It will be seen in Figure 1 which is full size to scale, that my new invention, as applied to a pulley, extends but a short distance further than the pulley in one direction only, so that it will be able to take the place of practically any standard pulley. And yet, because of the special construction it has as much capacity as my former invention; and because of the automatic adjustment provided by the washer 22 and the spring ring 26, and because of the initial contact and the small pressure thus obtained between the members of the clutch, the full engagement will take place after only a slight outward movement of the weights, regardless of wear on the clutch surfaces, till the full take-up provided by the automatic adjustment is used, the capacity of the clutch meantime remaining practically constant.

It will be noted, of course, that after the washer 22 has taken up a certain amount of wear between the members of the clutch, it will bottom in the groove 19. But exhaustive experiments have shown the wear to be at such a slow rate that years of satisfactory service can be expected before the limit of the adjustment by the washer 22 is reached.

The construction of the modified form shown in Figures 10 and 11 is the same as that shown in Figure 1 except for the fact that no belt is used, and the clutch drives one shaft by another shaft direct, the two shafts being approximately aligned with each other.

The rim 5 instead of being used for a pulley is in this form used to mount the flexible, or semi-flexible disc 28, the disc being attached to the rim by the screws 29.

The spider 30 has the hub 31 which is secured to the shaft 32 by the set screw 34, or may be secured thereon by any other proper means, the disc 28 being secured to the spider 30 by the screws 33, or in any other proper manner.

Thus the clutch is used to drive one shaft by another and without the use of a belt, the disc 28 affording sufficient adaptability between the two shafts for any probable misalignment in such a case, since it acts as a universal joint.

I am well aware of various alterations and modifications which may be made in my constant capacity automatic clutch without departing from the essence of my invention.

The materials, the methods of manufacture of the parts, the hardening or heat-treatment of some of the parts, are all, of course, subject to considerable variation.

But these, and other variations are such as might be expected of any intelligent mechanic, once my invention has been fully disclosed to him, so I do not wish to be limited to the exact forms and constructions shown and described, but what I claim as new, and desire to protect by Letters Patent, is as follows:—

1. In a constant capacity automatic friction clutch, having a driving and a driven member, adapted to be engaged by weights pivotally mounted upon the driving member when they are acted upon by centrifugal force, automatic take-up means mounted upon one of said members and, irreversible by the weights when acted upon by said centrifugal force, and including an actuating spring, and adapted to exert pressure upon one of said members to prevent clearance between them at any time.

2. In a constant capacity automatic friction clutch having a driving and a driven member, adapted to be engaged by weights pivotally mounted upon the driving member when they are acted upon by centrifugal force, automatic take-up means mounted adjacent one of said members and irreversible by the weights when acted upon by said centrifugal force, and including an actuating spring, and adapted to prevent clearance between the said members at any time.

3. In a constant capacity automatic friction clutch, having a driving and a driven member, adapted to be engaged by weights pivotally mounted upon the driving member when they are acted upon by centrifugal force, automatic take-up means mounted adjacent one of said members, and irreversible by the weights when acted upon by centrifugal force, and including an actuating spring, and adapted to take up the clearance between the members of the friction clutch at any time when said weights are not acted upon by centrifugal force.

4. In a constant capacity automatic friction clutch, a driving member and a driven member including a friction clutch adapted to join the two members to rotate together when fully engaged, means including weights adapted to be acted upon by centrifugal force to engage said members, and means in contact with one of said members and including an actuating spring and irreversible by the action of said weights, and adapted to automatically eliminate clearance between the clutch members when the weights are not acted upon by centrifugal force.

5. In an automatic friction clutch, having a driving and a driven member, the driving member having a large diameter and a small diameter portion, the driven member journaled upon the driving member including a bearing upon said large diameter portion, weights pivotally mounted upon said large diameter portion and adapted to have pivotal movement and to engage the driving and the driven members by said pivotal movement when acted upon by centrifugal force.

6. In an automatic friction clutch, having a driving and a driven member, the driving member having a large diameter and a small diameter portion, the driven member journaled upon the driving member including a bearing upon said large diameter portion, weights pivotally mounted upon said large diameter portion and adapted to have a pivotal movement and to engage the driving and the driven members by said pivotal movement when acted upon by centrifugal force, and automatic take-up means irreversible by the said action of the weights and including an actuating spring and adapted to exert pressure upon one of said members to prevent clearance between them at any time.

7. In a constant capacity automatic friction clutch having a driving and a driven member aligned by a bearing between them, adapted to be engaged by weights pivotally mounted upon the driving member when they are acted upon by centrifugal force, automatic take-up means mounted upon one of said members and irreversible by the weights when acted upon by said centrifugal force and adapted to exert pressure upon one of said members to prevent clearance between them at any time, the weights being pivotally mounted upon one of said members concentric with the said bearing and approximately aligned therewith axially.

8. In a constant capacity automatic friction clutch having a driving and a driven member aligned by a bearing between them, adapted to be engaged by weights pivotally mounted upon the driving member when they are acted upon by centrifugal force, automatic take-up means mounted adjacent one of said members and irreversible by the weights when acted upon by centrifugal force and including an actuating spring, and adapted to prevent clearance between the said members at any time, the weights being pivotally mounted upon one of said members concentric with the said bearing and approximately aligned therewith axially.

9. In an automatic friction clutch, a sleeve adapted to be securely mounted upon a shaft, a rim mounted upon the sleeve and revolvable thereon and adapted to act as one member of a friction clutch, a second and co-operating member of said friction clutch mounted to revolve with the sleeve but slidable thereon, weights pivotally mounted upon the sleeve and adapted when acted upon by centrifugal force to force the clutch members into engagement, and means mounted upon the sleeve and irreversible by action of the said weights and including a spring, adapted to slide the second clutch member toward the weights and maintain contact between the clutch members and the weights.

10. In an automatic friction clutch, a sleeve element, including one member of a friction clutch, adapted to be securely mounted upon a shaft, a rim element journaled upon the sleeve element, and including a co-acting member of said friction clutch, weights pivotally mounted upon one of said elements and adapted to exert an end thrust upon the adjacent clutch member under the action of centrifugal force, and means mounted upon the same element adjacent a co-acting member of the clutch and including a spring, and irreversible by said end thrust, and adapted to maintain a slight initial engagement of the clutch prior to the exertion of said end thrust.

11. In an automatic friction clutch, a sleeve element including one member of a friction clutch adapted to be securely mounted upon a shaft, a rim element journaled upon the sleeve element and including a co-acting member of said friction clutch, weights pivotally mounted upon one of said elements and adapted to exert an end thrust upon the adjacent clutch member under the action of centrifugal force and automatically adjustable means mounted upon the same element adjacent the co-acting member of the clutch and irreversible by the said end thrust and adapted to oppose said end thrust and to take up all clearance between said weights and clutch members when the weights are not acted upon by centrifugal force.

12. In an automatic clutch, a sleeve element including one member of a friction clutch, adapted to be securely mounted upon a shaft, and having an enlarged portion, a rim element journaled upon the sleeve element including a bearing upon said enlarged portion and including a co-acting member of said friction clutch, weights provided with arms pivotally mounted upon said enlarged portion and adapted to exert an end thrust upon the adjacent clutch member under the action of centrifugal force, and automatically adjustable means including an actuating spring, mounted upon the sleeve element and adapted to oppose the said end thrust and to take up any clearance between the weights and the members of the clutch when the device is stationary.

13. In an automatic friction clutch, a sleeve adapted to be securely mounted upon a shaft, two co-acting members of a friction clutch mounted upon the sleeve, one of said members adapted to revolve with the sleeve, the other member adapted to revolve upon the sleeve, and weighted levers pivotally mounted to revolve with one of said members and adapted to force engagement between the said members under the action of centrifugal force, and automatically adjustable means including an actuating spring, adjacent one of said members and mounted upon the same part as the weighted levers and irreversible by the force exerted by the weighted levers, and adapted to adjust the engagement of the clutch after wear of said members, when the device is stationary.

In testimony whereof I affix my signature.

CLARENCE WALTER TYDEMAN.